2 Sheets—Sheet 1.
A. T. De PUY.
TYPE CASE-STAND.
No. 173,113. Patented Feb. 8, 1876.
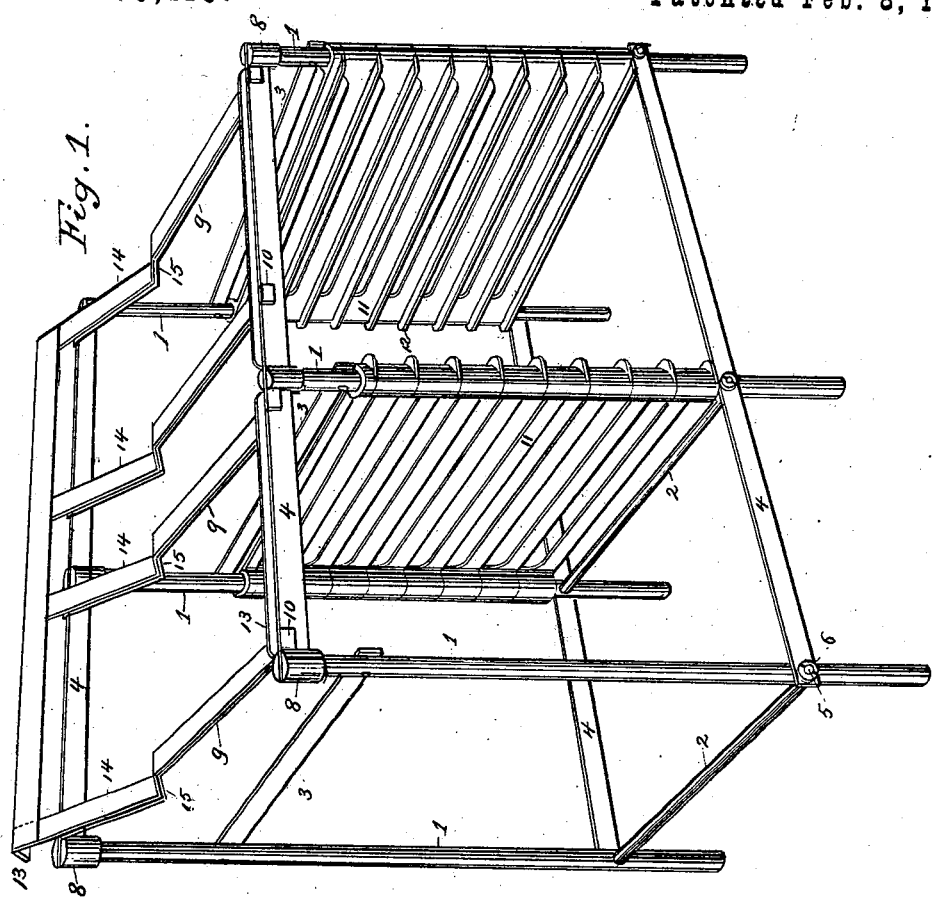
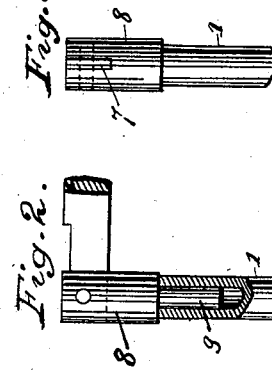
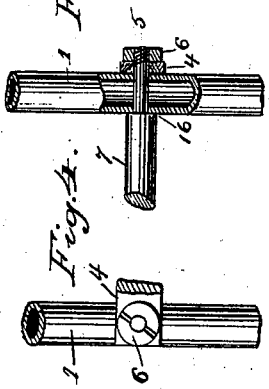
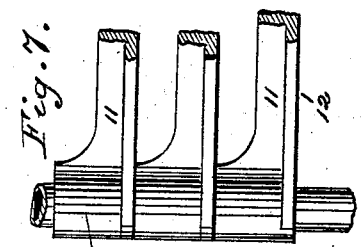
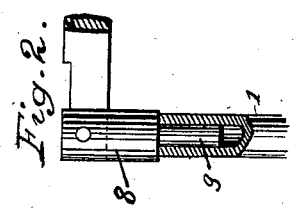
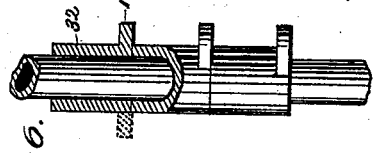
Witnesses
Inventor
Alexander T. De Puy,
N. PETERS, PHOTO-LITHOGRAPHER, WASHINGTON, D. C.

2 Sheets—Sheet 2.

A. T. De PUY.
TYPE CASE-STAND.

No. 173,113. Patented Feb. 8, 1876.

Witnesses
R. M. Spouls,
A. L. Munton

Inventor
Alexander T. De Puy,
per Munson & Philipp,
Attorneys.

UNITED STATES PATENT OFFICE.

ALEXANDER T. DE PUY, OF NEW YORK, N. Y., ASSIGNOR TO R. HOE & CO., OF SAME PLACE.

IMPROVEMENT IN TYPE-CASE STANDS.

Specification forming part of Letters Patent No. 173,113, dated February 8, 1876; application filed November 3, 1875.

*To all whom it may concern:*

Be it known that I, ALEXANDER T. DE PUY, of the city, county, and State of New York, have invented an Improvement in Type-Case Stands, of which the following is a specification:

In the drawings which form a part of this specification, and wherein like letters indicate like parts—

Figure 8:
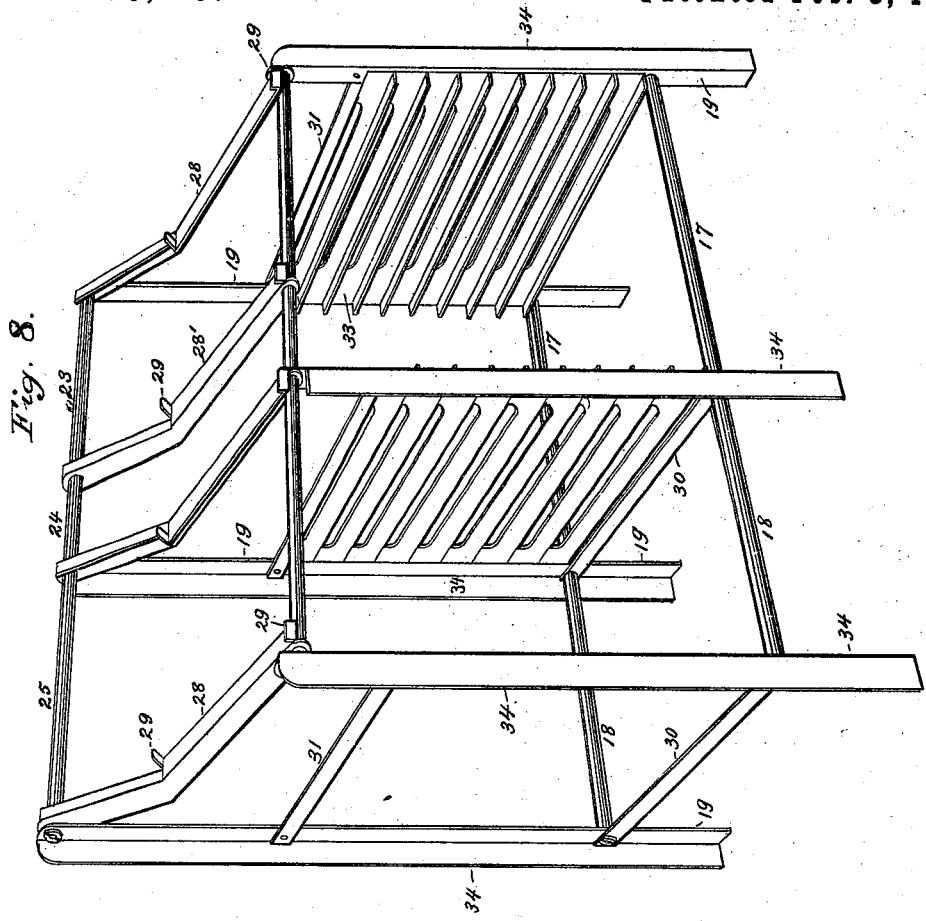
Figure 9:
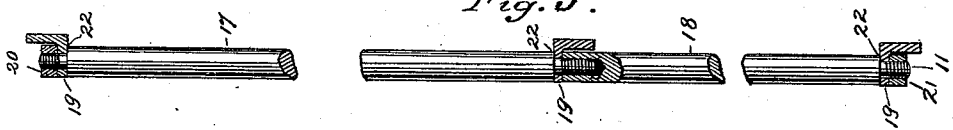
Figure 10:
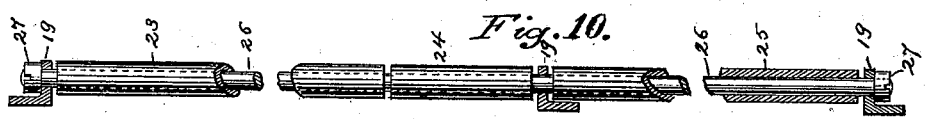
Figure 11:

Figure 1 is a perspective view of a type-case stand embodying my invention. Figs. 2 to 7, inclusive, show details of various parts thereof. Fig. 8 is a perspective view of a modification; and Figs. 9 to 12 are details of said modification.

The object of my invention is to improve the construction of type-case stands made of metal; and it consists in details too fully hereinafter described to need preliminary explanation.

The posts or uprights 1, preferably formed of iron piping, are secured together by transverse rods 2, transverse bars 3, and longitudinal bars 4. The rods 2 are reduced in size at a short distance from each end, so as to enter holes in and pass through the posts 1, the shoulders 16 thus formed bearing against the inner surfaces of the said posts 1. The ends 5 of these rods 2 also pass through the longitudinal bars 4, which are perforated to receive them, and are tapped with screw-threads to receive the nuts 6, which securely hold the said posts together. The bars 3 are connected to said posts 1 by bolts or screws, as may be preferred. The longitudinal bars 4 are seated in slots 7, in the heads 8, where they may be riveted or soldered, which heads are stemmed so as to enter and be securely held in the open upper ends of the hollow posts 1. The upper longitudinal bars 4 are thus capable of being raised, by a vertical movement, from out their sockets in the posts, and may thus be removed from the frame-work.

The lower ends of the heads 8 may be hollow, so as to form sockets or caps fitting over the ends of the posts 1, or stems extending from them.

The front and rear upper bars 4 are connected together by the case-supports 9, which are provided with hooked ends 10, made to lap over the bars 4 or to rest in recesses in the upper edges of said bars.

These case-supports 9 are thus capable of being removed at will from the stand. They are, moreover, provided with seats 15, formed by bending angles in them, which seats support the type-cases rested upon them in a manner well understood.

A supplemental case-supporting frame is constructed by uniting transverse bars 14 to longitudinal bars 13 of angle-iron. The bars 14 are of a form corresponding with that of the case-supports 9, but are of a greater length. This supplemental case-supporting frame is thus adapted to rest upon the supports 9, and provides bearings for the upper case, which extend above the rear bar 4 of the frame-work of the stand, thus supporting the said case, so that it cannot be accidentally tipped over or otherwise displaced from such position.

In the modification, Fig. 8, the posts or uprights 34 are made of angle-iron, and are secured together at their lower ends by longitudinal rods, which are made in sections 17 and 18. The sections 17 have their ends reduced in diameter, so as to pass through openings in the flanges 19 of the posts 34, against which their shoulders 22 abut. They are screw-threaded and are fastened in place by nuts 20, or enter screw-sockets in the inner ends of the sections 18. The outer ends of the sections 18 pass through the flanges 19, and are secured by nuts 21. The rods fastening the posts together at their upper ends may be constructed in the same manner. They are, however, preferably formed of pipe cut into sections 23, 24, and 25, the ends of which bear against the flanges 19 of the posts 34, and through which sections of pipe, and the perforated flanges 19, rods 26 are passed, their screw-threaded ends receiving nuts 27, which bear against the outer faces of the flanges of the end posts.

The case-supports 28 in this instance are made of angle-iron, whose flange is turned up at suitable points to form lugs 29, which act as seats for the upper and lower cases of type. The ends of these supports 28 are perforated to receive the rods 26, by which they are clamped between sections 23, 24, and 25 of the pipe, as will be understood from an inspection of Fig. 10.

The case-supports 28' may be made to slide upon the pipe-sections 23 24, which will then be united as one section. This adjustment is desirable, since it provides a means for supporting short cases, such as those used for job-fonts.

The transverse bars 30 may be held in place by the longitudinal rods 17 18, or be riveted or bolted directly to the posts 1, as are the transverse bars 31. The ribs 11 are iron castings, having ledges 12 projecting at right angles from their sides, and enlarged ends 32, which are perforated with eyes of a diameter sufficient to receive the cylindrical post 1, upon which they are strung, so as to rest upon each other in a vertical pile. The lowermost ribs are supported by their outer ends resting upon the lower bars 4, and the rest of the ribs are seated in like manner upon each other. An equal number of these ribs are placed upon the center and one set of the outer posts so as to face each other, and together form racks for the reception of the type-cases when not in use for composing matter. These ribs, though they will by their gravity usually remain in proper position, are preferably held in place by the cross-bars 3, but screws or bolts, uniting the upper ones to the posts, will secure them firmly.

Figure 12:
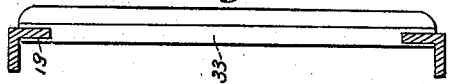

In the modification, Fig. 8, the ribs 33 are made of angle-iron, and are recessed at their ends, so as to embrace the flanges 19 of the angle-iron posts 34, as in Fig. 12. They are in other respects constructed and operate like the ribs 11. The said ribs 11 or 33, which are supported upon the central posts may be provided with ledges 12, extending in opposite directions, as shown in dotted lines, Fig. 6, which means the said ribs are adapted to support a set of cases on either or both sides of the central posts.

The several parts composing this stand may be readily disconnected, to permit them to be packed for shipment. This is accomplished by removing the supplemental frame 13 14 and the case-supports 9. The upper longitudinal bars 4 are then lifted from their sockets, and the lower longitudinal bars 4 are detached by unscrewing the nuts 6. This leaves the companion post 1 joined together by the rods 2 and the ribs 11. The parts are thus reduced to a form which permits them to be packed in a small compass, whereby they may be conveniently shipped or stored, since each of the pairs of posts 1, and the parts they support, may be packed closely together, while the detached parts are of such shape as to pack snugly with them, and form a compact mass requiring but little room.

The modification, Fig. 8, may be similarly disposed in compact form, by disconnecting the longitudinal rods, which releases the parts in like manner as described with reference to Fig. 1.

What I claim is—

1. In combination with the posts or uprights, the ribs constituting the rack of a type-case stand, constructed so as to be held in position by embracing the said posts or uprights, substantially as shown and described.

2. The case-supporting ribs, cast with right-angular projections 12, and provided with eyes or mortices in their ends, by which they may be strung, and supported upon the posts or uprights, substantially as shown and described.

3. The upper longitudinal rails 4 and stemmed heads 8, in combination with the hollow posts 1, substantially as shown and described.

4. The supplemental case-supporting frame, constructed of longitudinal bars 13 of angle-iron and transverse bars 14, substantially as shown and described.

5. The combination of the removable longitudinal bars 4, posts 1, transverse bars 3, and screw-rods 2, substantially as shown and described.

6. The case-supports 28, constructed of angle-iron, and provided with eyes for receiving the supporting-rods 26, substantially as shown and described.

7. The case-supports 28, constructed of angle-iron, and provided with the case-rests 29, substantially as shown and described.

8. In combination with the longitudinal supporting-bars, the sliding case-support 28', substantially as shown and described.

9. In combination with the angle-iron posts 34, the sectional rods or pipes, substantially as shown and described.

In testimony whereof I have signed my name to this specification in the presence of two subscribing witnesses.

ALEXANDER T. DE PUY.

Witnesses:
H. T. MUNSON,
C. W. FORBES.